US010176222B2

(12) United States Patent
Schneider et al.

(10) Patent No.: US 10,176,222 B2
(45) Date of Patent: Jan. 8, 2019

(54) QUERY PLAN OPTIMIZATION FOR PREPARED SQL STATEMENTS

(71) Applicant: Sybase, Inc., Dublin, CA (US)

(72) Inventors: Peter J. Schneider, Dublin, CA (US); Hui Zhang, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 134 days.

(21) Appl. No.: 14/635,882

(22) Filed: Mar. 2, 2015

(65) Prior Publication Data

US 2015/0169689 A1 Jun. 18, 2015

Related U.S. Application Data

(63) Continuation of application No. 12/897,477, filed on Oct. 4, 2010, now Pat. No. 8,996,503.

(51) Int. Cl.
*G06F 17/30* (2006.01)

(52) U.S. Cl.
CPC .. *G06F 17/30463* (2013.01); *G06F 17/30442* (2013.01); *G06F 17/30457* (2013.01)

(58) Field of Classification Search
CPC ................................... G06F 17/30442
USPC .......................................... 707/713
See application file for complete search history.

(56) References Cited

U.S. PATENT DOCUMENTS

| | | | |
|---|---|---|---|
| 5,717,919 A * | 2/1998 | Kodavalla | G06F 17/30339 |
| 5,812,996 A * | 9/1998 | Rubin | G06F 12/0866 |
| 5,822,749 A * | 10/1998 | Agarwal | G06F 12/0866 |
| 5,832,508 A * | 11/1998 | Sherman | G06F 17/30368 |
| 5,893,086 A | 4/1999 | Schmuck et al. | |
| 6,321,234 B1 * | 11/2001 | Debrunner | G06F 17/30306 |
| 6,353,818 B1 * | 3/2002 | Carino, Jr. | G06F 17/30463 |
| 6,980,985 B1 * | 12/2005 | Amer-Yahia | G06F 17/30433 |
| 7,389,313 B1 * | 6/2008 | Hsieh | G06F 17/30575 |
| 7,395,258 B2 * | 7/2008 | Altinel | G06F 17/3048 |
| 7,574,424 B2 * | 8/2009 | Chowdhuri | G06F 17/30445 |
| 7,743,053 B2 | 6/2010 | Al-Omari et al. | |
| 7,840,597 B2 | 11/2010 | Showalter et al. | |
| 7,890,549 B2 | 2/2011 | Elad et al. | |
| 8,065,329 B2 * | 11/2011 | Lei | G06F 17/30442 707/783 |
| 8,126,870 B2 * | 2/2012 | Chowdhuri | G06F 17/30445 707/636 |
| 8,363,959 B2 | 1/2013 | Boiman et al. | |
| 8,386,509 B1 | 2/2013 | Scofield et al. | |
| 2001/0051956 A1 | 12/2001 | Bird | |
| 2003/0014393 A1 | 1/2003 | Kabra et al. | |
| 2004/0103143 A1 * | 5/2004 | Chikada | G06F 17/30905 709/203 |
| 2007/0162421 A1 * | 7/2007 | Pang | G06F 17/30516 |
| 2008/0091646 A1 * | 4/2008 | Al-Omari | G06F 17/3048 |

(Continued)

*Primary Examiner* — Eliyah S. Harper
(74) *Attorney, Agent, or Firm* — Sterne, Kessler, Goldstein & Fox P.L.L.C.

(57) ABSTRACT

Disclosed herein are system, method, and computer program product embodiments for optimizing a query plan reuse in a database server system accessible by a plurality of client connections. An embodiment comprises determining if a query plan in a global cache storage is reserved by a client connection of a plurality of client connections, generating a cloned query plan from the query plan based on the determining, and associating the cloned query plan with a second client connection of the plurality of client connections.

14 Claims, 10 Drawing Sheets

1000

(56) References Cited

U.S. PATENT DOCUMENTS

2009/0192981 A1* 7/2009 Papaemmanouil ............................ G06F 17/30516
2010/0306256 A1 12/2010 Blackman
2011/0161281 A1* 6/2011 Sayyaparaju ..... G06F 17/30377 707/607
2012/0005158 A1* 1/2012 Bhatt ................ G06F 17/30368 707/609

* cited by examiner

QUERY PLAN OPTIMIZATION FOR PREPARED SQL STATEMENTS

CROSS-REFERENCE TO RELATED APPLICATIONS

This application is a continuation of U.S. patent application Ser. No. 12/897,477, filed Oct. 4, 2010, now allowed, which is incorporated herein by reference in its entirety.

BACKGROUND

Field of Invention

The invention relates generally to database server systems, and more specifically to optimizing prepared SQL statement processing by reusing query plans across client connections.

Description of the Background Art

Computer database server systems have become a prevalent means for data storage and retrieval. A database will commonly access the underlying data using a database server system. A client issues a query to the database server system that conforms to a defined query language. This simplifies the client's interaction with the database by not requiring that the client know or understand the underlying structure of the physical database. Because of this, however, it is imperative that the database server system generate and execute the query in a manner which is most efficient for the underlying database.

The database server system achieves a significant performance improvement by reusing query plans that have been previously generated by the database server system. Building and compiling query plans are expensive processes because the database server system requires access to global memory caches to search for, retrieve and store query plans. Access to global memory caches is achieved by way of an access spinlock. Each time the database server system uses the access spinlock, the database server system serializes the processes that require access to the global memory cache in a parallel computing environment. Excessive use of access spinlocks affects the database server system's performance, decreases the database server system's efficiency, and wastes valuable CPU cycles.

Therefore, what is needed is a database server system that does not build and compile query plans that have been previously saved in the global memory cache. What is also needed is a database server system that is operable to reuse query plans generated by SQL queries that have been received from multiple clients.

When clients use a conventional database server system, the conventional database server system saves objects that identify query plans in a local memory cache. The local memory cache is reserved for a particular client. Because the objects that identify query plans are saved in the local memory cache, the conventional database server system is not operable to determine that an identical query plan has been generated for multiple clients. If the conventional database server system is unable to determine that the identical query plans have been generated, the conventional database server system is not operable to reuse the generated query plan for multiple clients. Therefore, what are needed are systems and methods that are operable to reuse the generated query plan for clients that request an execution of the same SQL statement. What are also needed are systems and methods that allow cloning of the generated query plan when the generated query plan is requested by multiple client connections.

BRIEF SUMMARY OF THE INVENTION

Embodiments of the invention include a method for optimizing a query plan reuse in a database server system, comprising providing at least one global cache storage and a private cache storage to a plurality of client connections and coordinating utilization of the at least one global cache storage and the private cache storage to share light weight stored procedures (LWPs) and query plans for prepared SQL statements across the plurality of client connections via the at least one global cache storage while avoiding a spinlock access for executing the prepared SQL statements.

Embodiments of the invention additionally include a database server system for optimizing a query plan reuse comprising a first global cache storage configured to store a plurality of LWPs, a second global cache storage configured to store a plurality of query plans, wherein the first and second global cache storage are accessible to a plurality of client connections, a local cache storage configured to store a subset of LWPs wherein the subset of LWPs is associated with one client connection of the plurality of client connections, and a coordination module configured to access the first and second global cache storage and the local cache storage and determine if a query plan for a prepared SQL statement generated by at least one client connection of the plurality of client connections exists in the database server system and avoid an access spinlock for executing the prepared SQL statement.

Embodiments of the invention also include an article of manufacture including a computer-readable medium having instructions stored thereon that, when executed by a computing device, cause said computing device to perform operations comprising providing at least one global cache storage and a private cache storage to a plurality of client connections, and coordinating utilization of the at least one global cache storage and the private cache storage to share LWPs and query plans for prepared SQL statements across the plurality of client connections via the global cache storage while avoiding a spinlock access for executing the prepared SQL statements.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
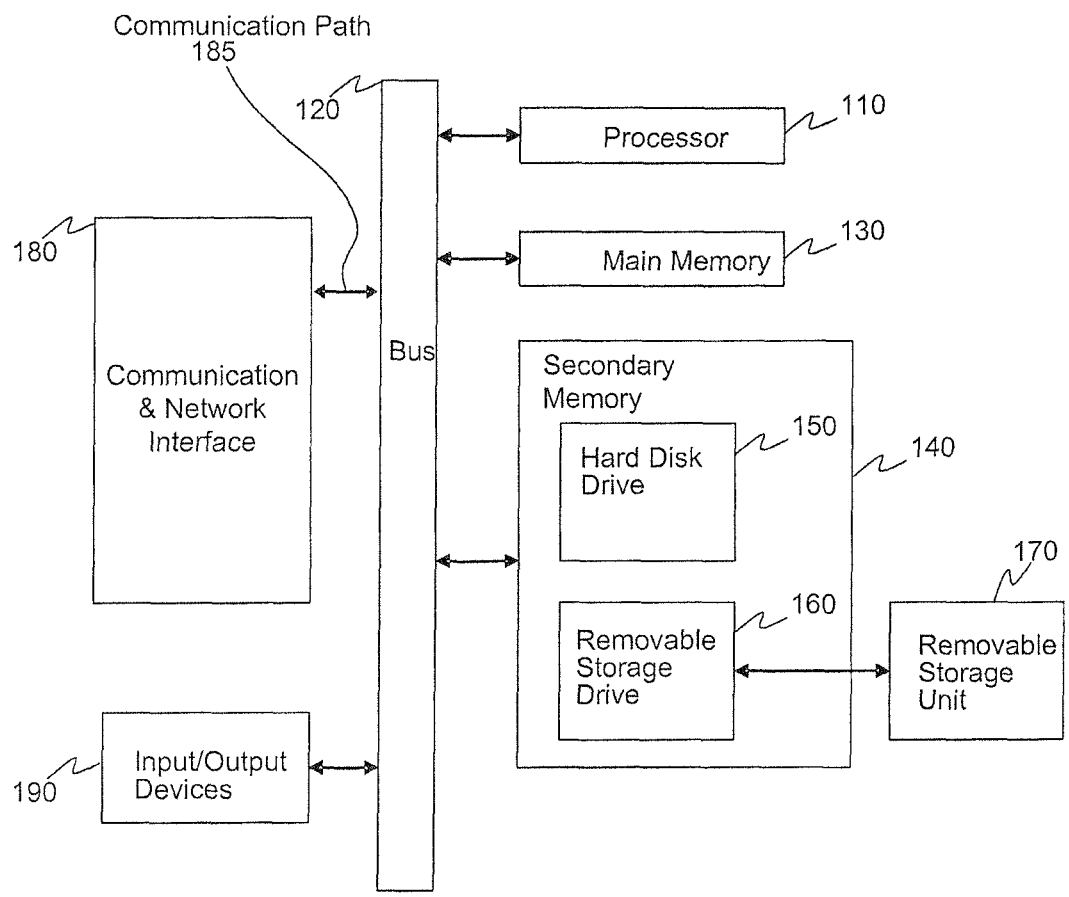
FIG. 1 is an exemplary computer system 100 in which embodiments of the invention may be implemented.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Various aspects of the invention can be implemented by software, firmware, hardware, or a combination thereof. FIG. 1 illustrates an example computer system 100 in which the invention, or portions thereof, can be implemented as computer-readable code. For example, the methods illustrated by flowcharts described herein can be implemented in system 100. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 210. Processor 210 can be a special purpose or a general purpose processor. Processor 210 is connected to a communication infrastructure 120 (for example, a bus or network).

Computer system 100 also includes a main memory 130, preferably random access memory (RAM), and may also include a secondary memory 140. Secondary memory 140 may include, for example, a hard disk drive 150, a removable storage drive 160, and/or a memory stick. Removable storage drive 160 may comprise a floppy disk drive, a magnetic tape drive, an optical disk drive, a flash memory, or the like. The removable storage drive 160 reads from and/or writes to a removable storage unit 170 in a well known manner. Removable storage unit 170 may comprise a floppy disk, magnetic tape, optical disk, etc. which is read by and written to by removable storage drive 160. As will be appreciated by persons skilled in the relevant art(s), removable storage unit 170 includes a computer usable storage medium having stored therein computer software and/or data.

In alternative implementations, secondary memory 150 may include other similar means for allowing computer programs or other instructions to be loaded into computer system 100. Such means may include, for example, a removable storage unit 170 and an interface 120. Examples of such means may include a program cartridge and cartridge interface (such as that found in video game devices), a removable memory chip (such as an EPROM, or PROM) and associated socket, and other removable storage units 170 and interfaces 120 which allow software and data to be transferred from the removable storage unit 170 to computer system 100.

Computer system 100 may also include a communications and network interface 180. Communications interface 180 allows software and data to be transferred between computer system 100 and external devices. Communications interface 180 may include a modem, a communications port, a PCMCIA slot and card, or the like. Software and data transferred via communications interface 180 are in the form of signals which may be electronic, electromagnetic, optical, or other signals capable of being received by communications interface 180. These signals are provided to communications interface 180 via a communications path 185. Communications path 185 carries signals and may be implemented using wire or cable, fiber optics, a phone line, a cellular phone link, an RF link or other communications channels.

The network interface 180 allows the computer system 100 to communicate over communication networks or mediums such as LANs, WANs the Internet, etc. The network interface 180 may interface with remote sites or networks via wired or wireless connections.

In this document, the terms "computer program medium" and "computer usable medium" are used to generally refer to media such as removable storage unit 170, removable storage drive 160, and a hard disk installed in hard disk drive 150. Signals carried over communications path 185 can also embody the logic described herein. Computer program medium and computer usable medium can also refer to memories, such as main memory 130 and secondary memory 140, which can be memory semiconductors (e.g. DRAMs, etc.). These computer program products are means for providing software to computer system 100.

Computer programs (also called computer control logic) are stored in main memory 130 and/or secondary memory 140. Computer programs may also be received via communications interface 180. Such computer programs, when executed, enable computer system 100 to implement the invention as discussed herein. In particular, the computer programs, when executed, enable processor 210 to implement the processes of the invention, such as the steps in the methods illustrated by flowcharts discussed above. Accordingly, such computer programs represent controllers of the computer system 100. Where the invention is implemented using software, the software may be stored in a computer program product and loaded into computer system 100 using removable storage drive 160, interface 120, hard drive 150 or communications interface 180.

The computer system 100 may also include input/output/display devices 190, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

Figure 2:
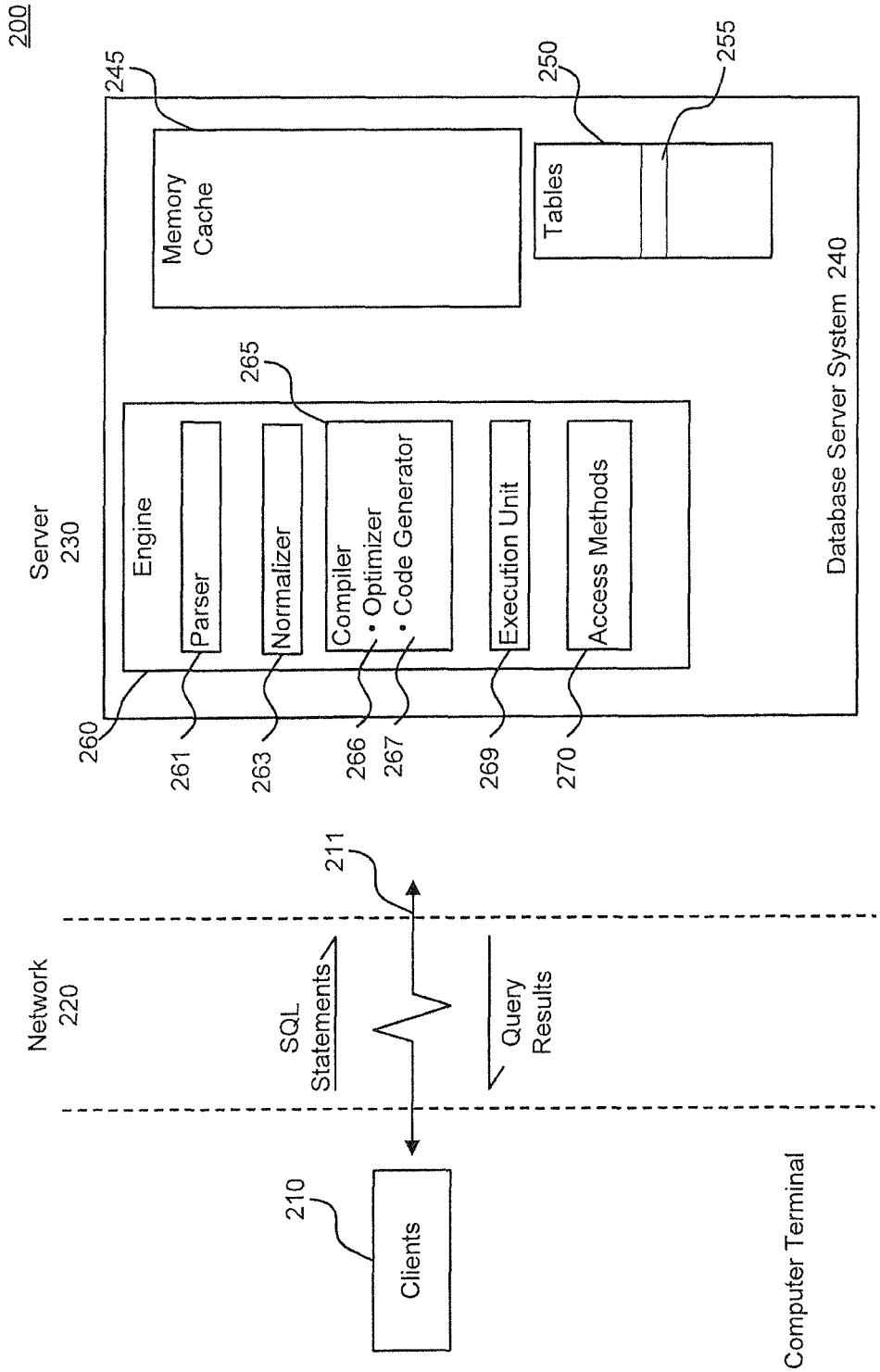
FIG. 2 is an exemplary database computing environment 200 in which embodiments of the invention may be implemented.

While the invention may operate within a single (standalone) computer (e.g., system 100 of FIG. 1), the present invention may also be embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals connected to a database server system 240 using a conventional network. In an exemplary embodiment, the terminals may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, Windows XP, Windows Vista or Windows 7).

The database server system 240, which comprises Sybase® Adaptive Server® Enterprise (ASE) (available from Sybase, Inc. of Dublin, Calif.) in an exemplary embodiment, generally operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240. The described computer hardware and software are presented for purposes of illustrating the basic underlying desktop and server computer components that may be employed for implementing the present invention. For purposes of discussion, the following description will present examples in which it will be assumed that there exist multiple server instances (e.g., database server nodes) in a cluster that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Client/server environments, database servers, and networks are well documented in the technical, trade, and patent literature. In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access method 270. Specifically, the SQL statements are passed to the parser 261 which employs conventional parsing methodology (e.g., recursive descent parsing). The parsed query is then normalized by the normalizer 263.

Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query is passed to the compiler 265, which includes an optimizer 266 and a code generator 267. The optimizer 266 performs a cost-based analysis for formulating a query plan that is reasonably close to an optimal plan. The code generator 267 translates the query plan into executable form for execution. The execution unit 269 executes the query plan using the access methods 270.

In an embodiment, the query plan is a set of instructions that tell database server system 240, how to, for example, create, select, insert, update or delete data in the database tables 250. Building and compiling (or generating) the query plan is an expensive process. Database server system 240, therefore, achieves an improvement in efficiency and response time in executing the SQL query by reusing the previously generated query plans. The improvement in efficiency is achieved by avoiding unnecessary normalizing, building and compiling operations.

Although database server system 240 is operable to reuse query plans for any SQL query, a person skilled in the art will appreciate that reusing a query plan is beneficial for SQL queries that are received by database server system 240 multiple times and from the same or multiple clients 210. In an embodiment, the SQL query that is frequently received by database server system 240 is a prepared SQL statement (also known as dynamic SQL statement). The prepared SQL statement is a SQL query where values and/or table names are inserted in real-time when the prepared SQL statement is executed. Exemplary embodiments of several prepared SQL statements include, but are not limited to:

```
insert into table 1 (column1, column2, column3) values (?, ?, ?)
update table 1 set column2 = ? where column 1 = ?
select * from table 1 where column3 = ?
```

The "?", also known as a parameter marker, indicates the place holders for values that will be provided to database server system 240 during the execution phase of the prepared SQL statement. In an embodiment, values are provided to database server system 240 when a client 210 sends an "SQL execute" command that is described below.

In an embodiment, database server system 240 is operable to reuse query plans for prepared SQL statements such as, but not limited to SELECT, INSERT, UPDATE and DELETE.

In an embodiment, client 210 sends two messages to database server system 240 when client 210 requests the server to execute the prepared SQL statement. First, client 210 sends a SQL prepare message. The SQL prepare message causes database server system 240 to create a framework for execution of the prepared SQL statement. Second, client 210 sends a SQL execute message to database server system 240. The SQL execute message causes the database server system 240 to generate a query plan, and execute the query plan using predetermined values, such as "i", "j" and "k" described below. For example, suppose client 210 executes the following commands:

```
EXEC SQL prepare xw1 from "insert into table1 values (?, ?, ?)"
i = 5; j = 6; k=7;
```

```
EXEC SQL execute xw1 using :i :j :k;
i = 10; j=11; k=2;
EXEC SQL execute xw1 using :i, :j, :k;
```

In an embodiment, after database server system 240 receives the above "SQL prepare" statement, database server system 240 initiates a Dynamic SQL Prepare process. When database server system 240 executes the Dynamic SQL Prepare process, database server system 240 executes the "EXEC SQL prepare xw1 from "insert into table 1 values (?, ?, ?)" statement. The Dynamic SQL Prepare process creates a light-weight stored procedure ("LWP") object. Unlike the user generated stored procedures that are stored in database tables 250, LWP objects are stored in database server system 240 memory caches 245. In an embodiment, memory caches 245 are a Dynamic SQL Cache 340 and a SQL Statement Cache 350 (See FIG. 3). The LWP object contains the SQL text, such as, for example, "insert into table1 values (?, ?, ?)". The Dynamic SQL Prepare process also creates a query tree that is associated with the SQL text included in the LWP object. The query tree is stored in the memory cache, such as, for example a Procedure Cache 360.

In an embodiment, database server system 240 stores the SQL text associated with the prepared SQL statement in memory, such as, for example a memory cache 245 or main memory 130. Thus, when client 210 sends the prepare message, such as, for example, "EXEC SQL prepare xw1 from "insert into table1 values (?, ?, ?)", client 210 sends only the name of the prepare SQL statement, such as, for example, "xw1 ". After database server system 240 receives the prepare SQL statement name, database server system 240 maps the prepare SQL statement with the corresponding SQL text.

In an embodiment, after database server system 240 receives the execute command from client 210, such as, for example, "EXEC SQL execute xw1 using :i :j :k", database server system 240 initiates the Dynamic SQL Execute process. The Dynamic SQL Execute process generates a query plan from the query tree that was generated by the Dynamic SQL Prepare process. The Dynamic SQL Execute process also executes the generated query plan. A person skilled in the relevant art will appreciate that variables "i", "j" and "k" are values set by client 210.

In an embodiment, the query plan generated by the Dynamic SQL Execute process is saved in the global memory cache, such as, Procedure Cache 360. The corresponding LWP object is saved in another global memory cache, such as, SQL Statement Cache 350. Because the query plan and the LWP object are saved in the global memory caches, database server system 240 is operable to reuse the generated query plan when it receives identical prepared SQL statements from multiple clients 210.

2. Memory Caching in Database Server System

Figure 3:
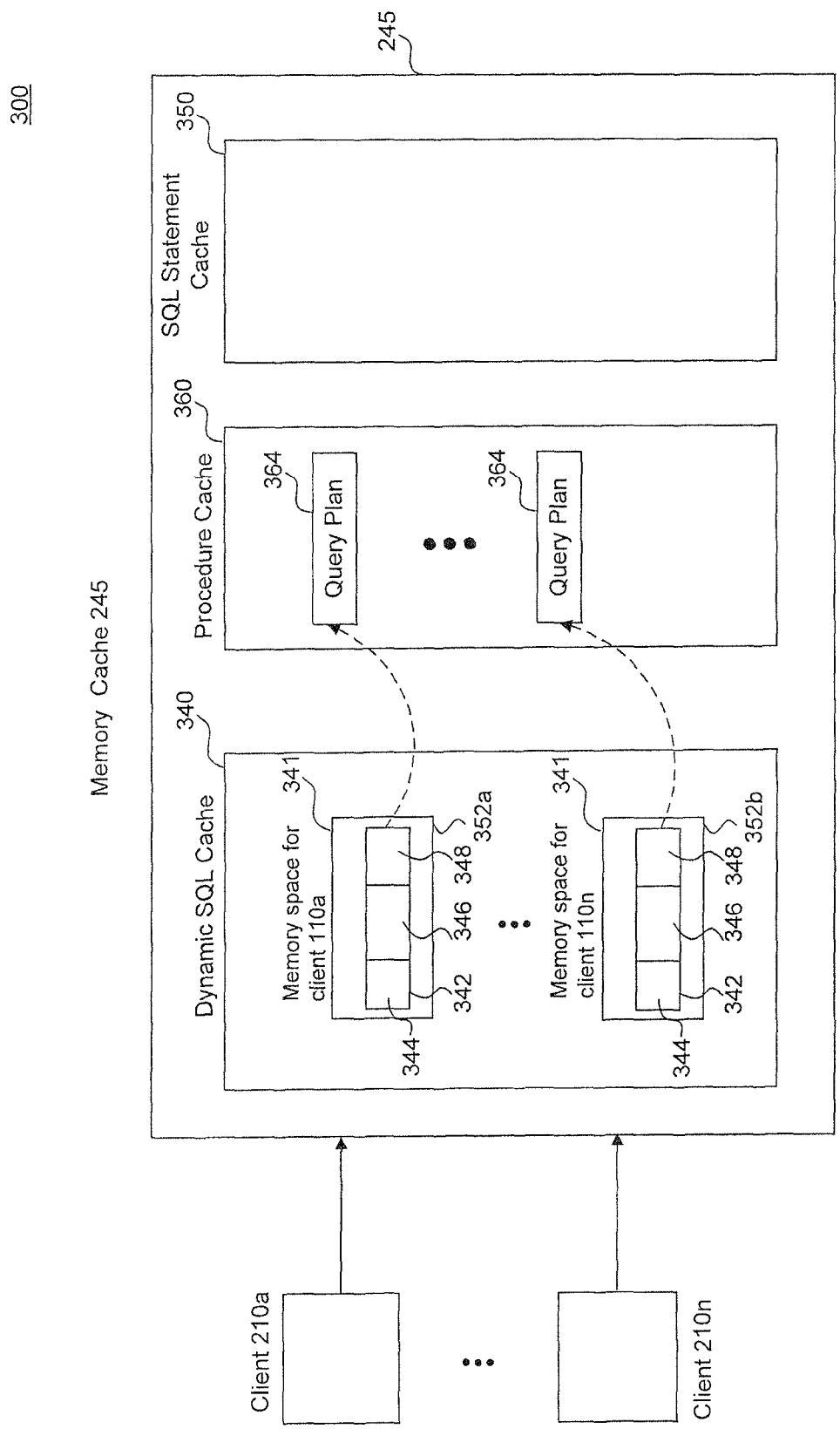
FIG. 3 is an exemplary operating embodiment 300 of memory caches associated with the database server system.

As described above, database server system 240 includes a memory cache 245. FIG. 3 is an exemplary embodiment 300 of memory cache 245.

In an embodiment, memory cache 245 is extended to include three memory caches. Memory cache 245 includes Dynamic SQL Cache 340, SQL Statement Cache 350 and Procedure Cache 360. By using Dynamic SQL Cache 340, SQL Statement Cache 350 and Procedure Cache 360, database server system 240 is operable to save and reuse query plans across client connections.

Dynamic SQL Cache 340 includes multiple memory spaces 341. Each memory space 341 stores data objects associated with a particular client 210. In an embodiment, when client 210 connects to database server system 240, memory space 341 is allocated for client 210 in Dynamic SQL Cache 340.

Each memory space 341 includes multiple Dynamic SQL Cache entries 342. Each Dynamic SQL Cache entry 342 includes LWP data associated with the prepared SQL statement received from client 210. Dynamic SQL Cache entry 342 includes an LWP object identifier (LWP object ID) 344 and an LWP name 346. Also, unlike conventional systems, Dynamic SQL Cache entry 342 includes a query plan reference 348. Query plan reference 348 references the query plan associated with the LWP object that is stored in Procedure Cache 360. Database server system 240 uses the query plan reference 348 to access the query plan that is stored in Procedure Cache 360 in lieu of using the access spinlock.

Dynamic SQL Cache 340 is a local memory cache. Because Dynamic SQL Cache 340 is a local memory cache, each memory space 341 contains only Dynamic SQL entries 342 that are associated with particular client 210. Moreover, because Dynamic SQL Cache 340 is a local memory cache, an access spinlock is not necessary to access memory spaces 341.

Unlike conventional database server systems, memory cache 245 includes Statement Cache 350. Database server system 240 uses Statement Cache 350 to map the name of the prepared SQL statement, such as "xw1" described above, to the corresponding SQL text. In an embodiment, Statement Cache 350 stores an LWP object identifier (LWP object ID) 454, an LWP name 456 and a SQL text 458 (see FIG. 4). SQL text 458 is associated with the prepared SQL statement text received from client 210.

Unlike a conventional database server system, the invention allows for query plan sharing across client connections. When database server system 240 receives the prepared SQL statement from client 210, database server system 240 determines if a corresponding LWP object ID 454 exists in Statement Cache 350. Statement Cache 350 allows database server system 240 to determine if the LWP object was previously generated by other clients 210. If the LWP object exists, database server system 240 avoids generating another identical LWP object and the corresponding query plan for the prepared SQL statement.

Conventional database server systems are not operable to share query plans across client connections. In conventional database server systems, client connections do not share LWP objects or other identifiers in a global memory cache. As a result, when the conventional database server system receives identical prepared SQL statements from multiple clients, the conventional database server system proceeds to create an identical query plan for each client connection. Each time the conventional database server system generates another instance of the query plan, it loses valuable resources and increases the system response time to the client.

SQL Statement Cache 350 and Procedure Cache 360 are global memory caches. A person skilled in the art will appreciate that, in an embodiment, database server system 240 is operable to access global memory caches by using an access spinlock. The access spinlock ensures that only one process is operable to access a global memory cache at a time.

In the database server system that implements parallel processing, the access spinlock serializes the processes because processes have to wait until the access spinlock is released by a process that is accessing the global memory space. In conventional database server systems, an excessive use of access spinlocks results in unnecessary wait time by multiple processes and decreases the system's performance. Therefore, reducing the use of access spinlocks by reusing generated query plans increases the efficiency of a database server system, such as database server system 240.

Procedure Cache 360 stores and manages query plans that are generated by database server system 240. The query plans are stored as query plan entries 364.

In an embodiment, Procedure Cache 360 also provides an Application Interface (API) to install, delete, retrieve and release query plans.

In an embodiment, database server system 240 includes a Procedure Cache Manager (not shown). The Procedure Cache Manager manages query plan entries 364 and the Procedure Cache access spinlock. In an embodiment, database server system 240, uses the Procedure Cache Manager to reserve and release query plans. For example, when client 210 sends the prepared SQL statement to database server system 240, the Procedure Cache Manager reserves the query plan for client 210. In an embodiment, the query plan is reserved until the execution of the prepared SQL statement is complete.

In yet another embodiment, the query plan is reserved or "pinned" as long as client 210 maintains a connection with database server system 240. While the query plan is reserved or pinned, the Procedure Cache Manager ensures that the query plan is not accessed by another process. In this embodiment, the database server system 240 avoids generating multiple query plans by implementing query plan cloning, described below.

When database server system 240 accesses the query plan for a particular client 210, database server system 240 uses the access spinlock to access Procedure Cache 360. In an embodiment, database server system 240 uses the access spinlock to reserve the query plan, release the query plan, and install the query plan in Procedure Cache 360. As discussed in detail below and illustrated in FIG. 6 and FIG. 7, a conventional database server system uses the assess spinlock to access a global memory cache, such as Procedure Cache 360, multiple times. Each time the conventional database server system uses the access spinlock to access a memory cache for a particular process, other processes have to wait until the access spinlock releases the memory cache. As a result, the conventional database server system wastes valuable CPU cycles when it generates identical query plans for multiple client connection.

2. Executing Dynamic SQL Prepare and Dynamic SQL Execute Processes

As described above, database server system 240 executes the prepared SQL statement in a two-step process. First, database server system 240 executes the Dynamic SQL Prepare process. Next, database server system 240 executes the Dynamic SQL Execute process. A Dynamic SQL Prepare process determines the query tree for the prepared SQL statement received from client 210. A Dynamic SQL Execute process compiles a query plan from the query tree and executes the query plan. In an embodiment, Dynamic SQL Execute process reuses the query plan that is stored in Procedure Cache 360.

Figure 5A:
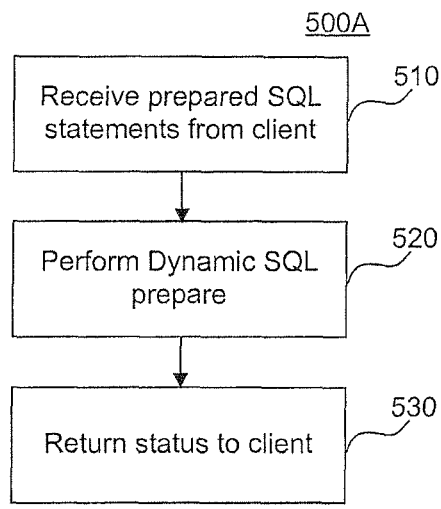
FIGS. 5A and 5B are flowcharts of an exemplary embodiment 500 illustrating the database server system compiling and executing a query plan.

FIG. 5A is a flowchart illustrating an embodiment 500A of database server system 240 executing the Dynamic SQL Prepare process. In an embodiment, the Dynamic SQL Prepare process begins when database server system 240 receives an "EXEC SQL prepare" command from client 210.

At step 510, database server system 240 receives the prepared SQL statement from client 210. A prepared SQL statement includes the prepared SQL statement name and associated SQL text.

In an embodiment, the prepared SQL statement does not include the SQL text. When database server system 240 receives the prepared SQL statement, database server system 240 uses the prepared SQL statement name to retrieve the associated SQL text from main memory 130 or memory cache 245.

At step 520, database server system 240 executes the Dynamic SQL Prepare process and determines the query tree. Unlike conventional database server systems, that build the query tree each time a prepared SQL statement is received from multiple clients, database server system 240 builds the query tree only if the query plan does not exist in Procedure Cache 360. Database server system 240, therefore, avoids generating identical query plans and avoids using access spinlocks to access Procedure Cache 360 when the generated query plan exists.

At step 530, database server system 240 returns a status of the Dynamic SQL Prepare process to client 210.

Figure 5B:
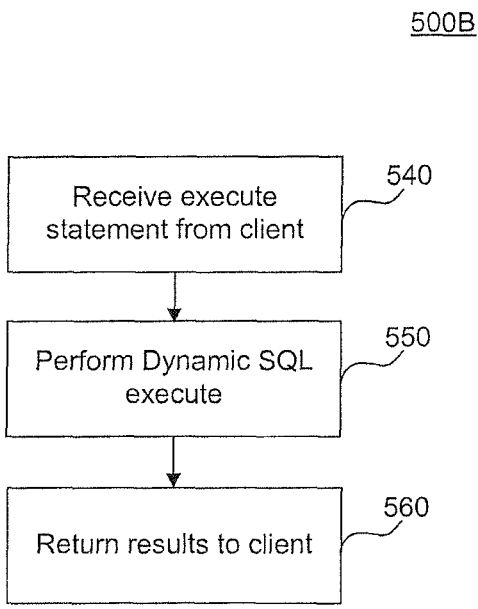

FIG. 5B is a flowchart illustrating an embodiment 500B of database server system 240 executing the Dynamic SQL Execute process. In an embodiment, the Dynamic SQL Execute process begins when client 210 sends the "EXEC SQL execute" command to database server system 240.

At step 540, database server system 240 receives the "EXEC SQL execute" command from client 210.

Figure 7:
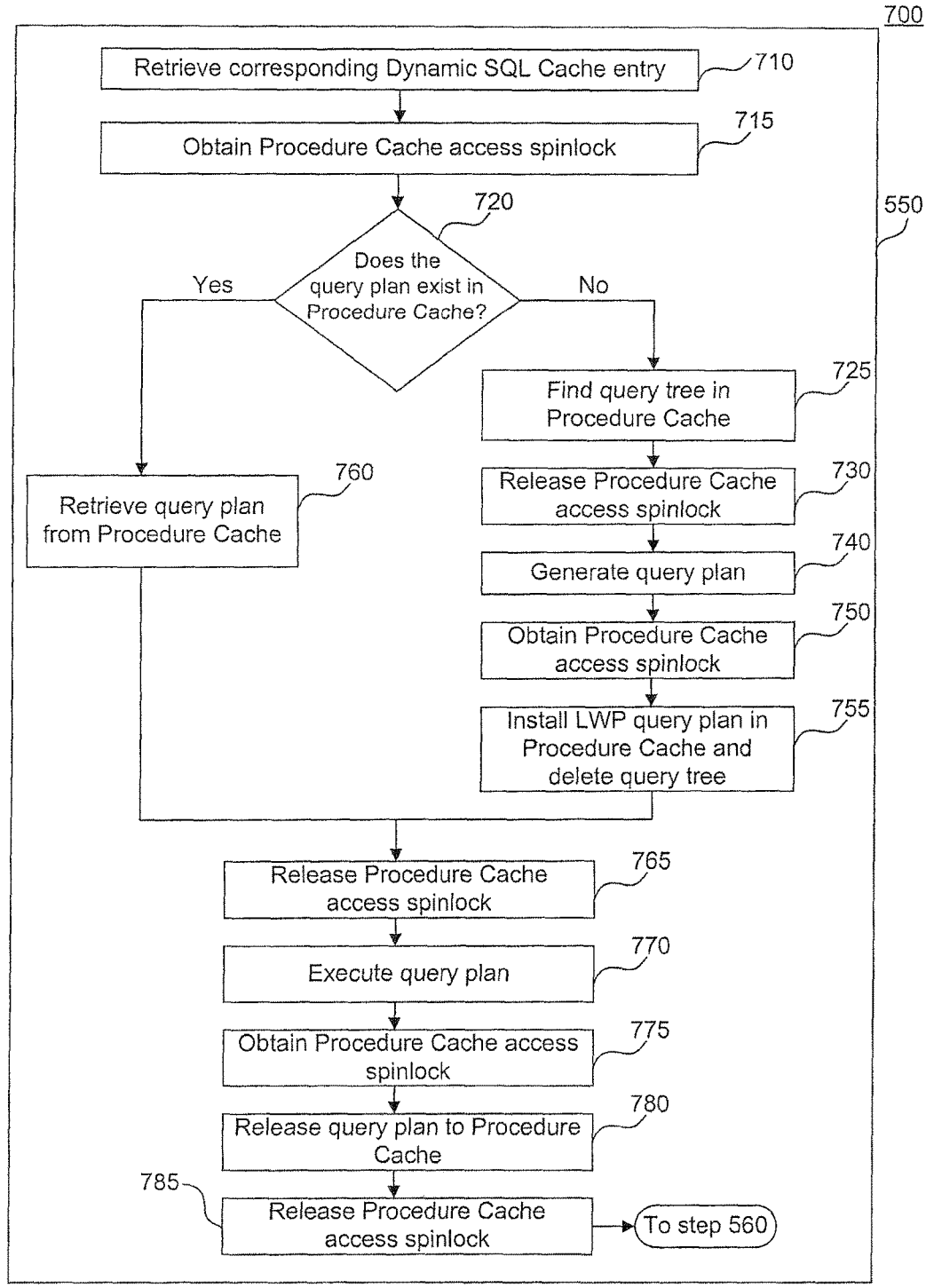
FIG. 7 is a flowchart 700 illustrating a conventional database server system executing a Dynamic SQL Execute process.

At step 550, database server system 240 executes the Dynamic SQL Execute process. A conventional database server system, such as described in FIG. 7, generates and executes a query plan each time client 210 sends a new prepared SQL statement. As a result, the conventional database server system generates multiple instances of identical query plans. Moreover, as illustrated in FIG. 7, the conventional database server system uses the access spinlock multiple times to access the global memory cache each time the conventional database server system needs to create, install or retrieve a query plan from the global memory cache.

Figure 9:
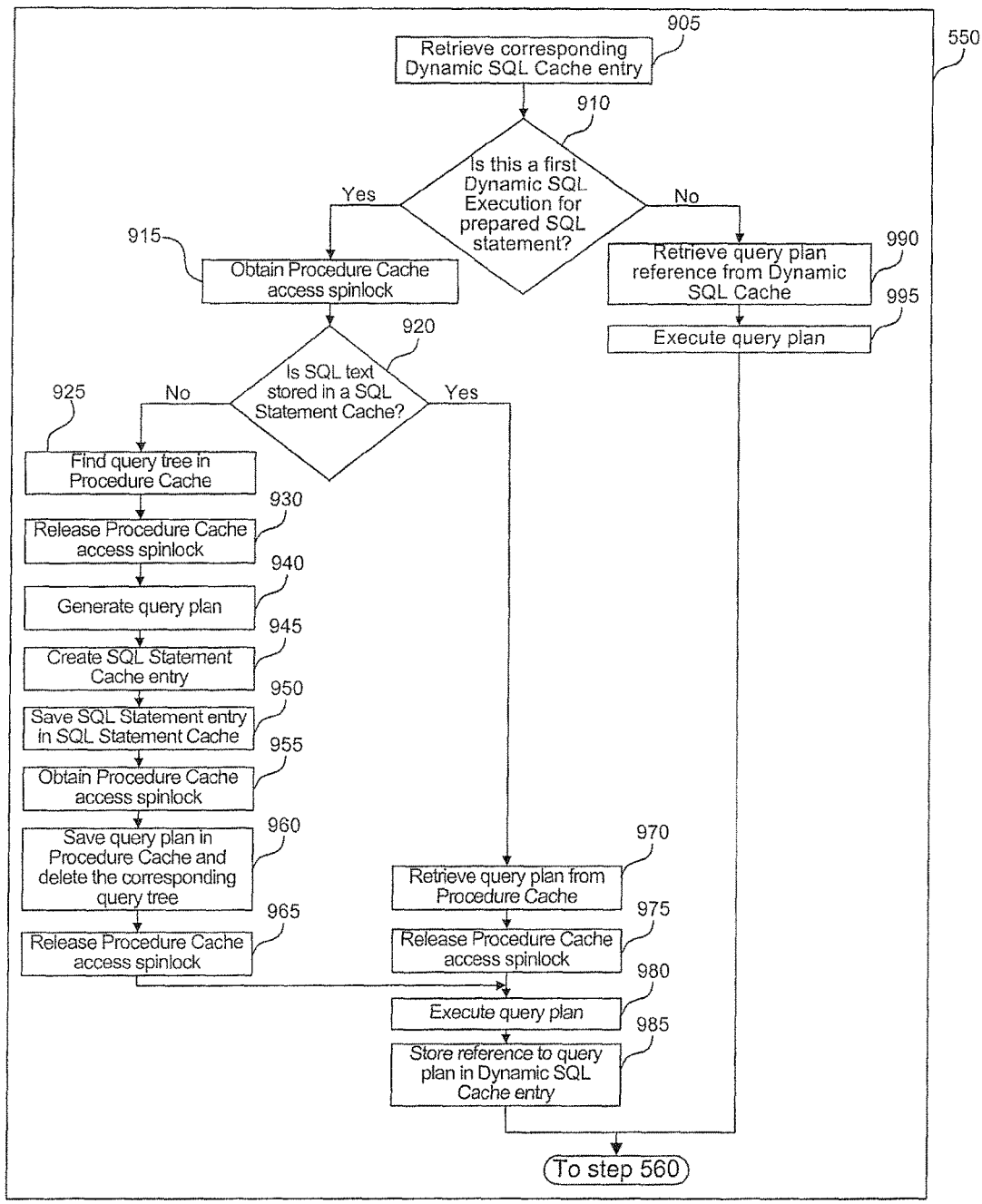
FIG. 9 is a flowchart of an exemplary embodiment 900 illustrating the steps of executing a Dynamic SQL Execute process.

As described in detail in FIG. 9, database server system 240, generates a query plan when the query plan for the prepared SQL statement does not exist in Procedure Cache 360. Unlike conventional database server systems, database server system 240 generates the query plan when it receives a new instance of the prepared SQL statement from any client 210. After the query plan is generated, database server system 240 reuses the generated query plan to execute the prepared SQL statement when it receives an identical prepared SQL statement from another client 210.

At step 560, database server system 240 sends results of the executed query plan to client 210.

3. Query Processing for Prepared SQL Statements in Conventional Systems

Figure 6:
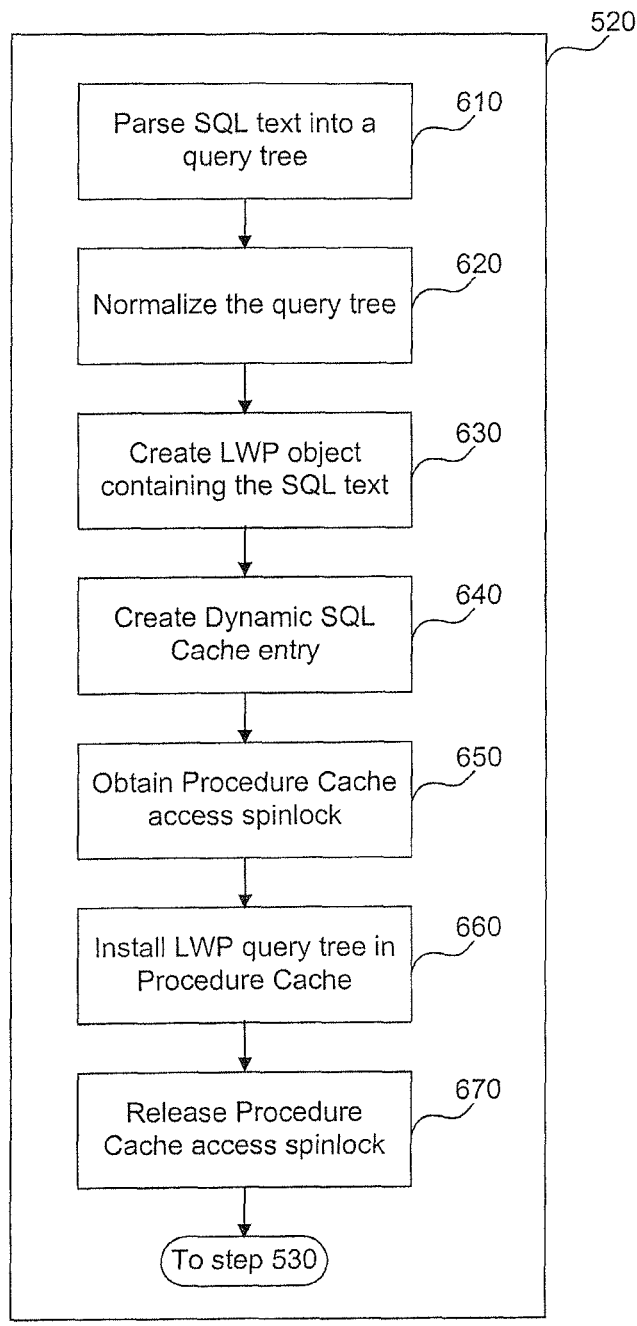
FIG. 6 is a flowchart 600 illustrating a conventional database server system executing a Dynamic SQL Prepare process.

FIG. 6 is an illustrative embodiment 600 of a conventional database server system generating the LWP object and the query tree for the prepared SQL statement. In other words, FIG. 6 shows a conventional approach to perform step 520.

At step 610, the conventional database server system parses the SQL text into the query tree.

At step 620, the conventional database server system compiler normalizes the query tree.

At step 630, the conventional database server system creates the LWP object containing the prepared SQL statement.

At step 640, the conventional database server system creates an entry in the memory cache, such as the Dynamic SQL Cache. The entry includes the LWP object created in step 630.

At steps 650-670, the conventional database server system saves the query tree associated with the LWP object in the global memory cache, such as the Procedure Cache. As described above, the access spinlock ensures that only one process is operable to access the global memory cache at a time.

In particular, at step 650, the conventional database server system obtains the access spinlock for the Procedure Cache.

At step 660, the conventional database server system saves the query tree in the Procedure Cache.

At step 670, the conventional database server system releases the access spinlock so that another process using the conventional database server system is operable to access the global memory cache. After step 670, the conventional database server system proceeds to step 530, as described above.

FIG. 7 is a flowchart illustrating an embodiment 700 of a conventional database server system generating and executes the query plan. FIG. 7 shows a conventional approach for performing step 550.

At step 710, the conventional database server system retrieves the Dynamic SQL Cache entry of step 640. The entry includes a LWP object associated with the query tree that was installed in the Procedure Cache at step 660.

At step 715, the conventional database server system obtains the access spinlock for the Procedure Cache.

At step 720, the conventional database server system determines if the query plan associated with the prepared SQL statement from the client exists in the Procedure Cache.

If the conventional database server system determines that the query plan exists, the conventional database server system retrieves the saved query plan from the Procedure Cache at step 760. The database server system then proceeds to step 765.

However, if the conventional database server system determines that the query plan does not exist in the Procedure Cache, the conventional database server system proceeds to step 725.

At step 725, the conventional database server system finds the query tree of step 660 in the Procedure Cache.

At step 730, the conventional database server system releases the Procedure Cache access spinlock.

At step 740, the conventional database server system generates the query plan for the LWP object.

At step 750, the conventional database server system obtains the Procedure Cache access spinlock in order to save the query plan generated in step 740 in the Procedure Cache.

At step 755, the conventional database server system saves the query plan in the Procedure Cache.

At step 765, the conventional database server system releases the access spinlock.

At step 770, the conventional database server system executes the query plan.

At steps 775-785 the conventional database server system releases the query plan back to the Procedure Cache.

In particular, at step 775, the conventional database server system obtains the access spinlock to access the Procedure Cache.

At step 780, the conventional database server system releases the query plan to the Procedure Cache.

At step 785, the conventional database server system releases the access spinlock. After the conventional database server system releases the access spinlock, the results of the executed query plan are sent to the client at step 560.

In the example above, the conventional database server system obtains the access spinlock to access the Procedure Cache at least four times when the client sends the prepared SQL statement to the server. When the client sends the same prepared SQL statement to the conventional database server for the second or subsequent time, the conventional database server system obtains the access spinlock to access the Procedure Cache at least three times. The conventional database server system repeats this process for each client that sends an identical prepared SQL statement, even though the instance of the query plan has been generated by a request from a different client. As described above, when the global memory space, such as the Procedure Cache, is accessed by the conventional database server system, other processes are prevented from accessing the global memory cache and must wait until each process is able to obtain the access spinlock. This results in serialized processing in a parallel database server system. As a result, the conventional database server system exhibits a decrease in performance and efficiency when it receives identical prepared SQL statements from multiple clients.

3. Sharing Query Plans Across Connections

Unlike conventional database server systems, database server system 240 is operable to share and reuse query plans. As a result, database server system 240 uses the access spinlocks to access Procedure Cache 360 less frequently than the conventional database server systems.

Figure 4:
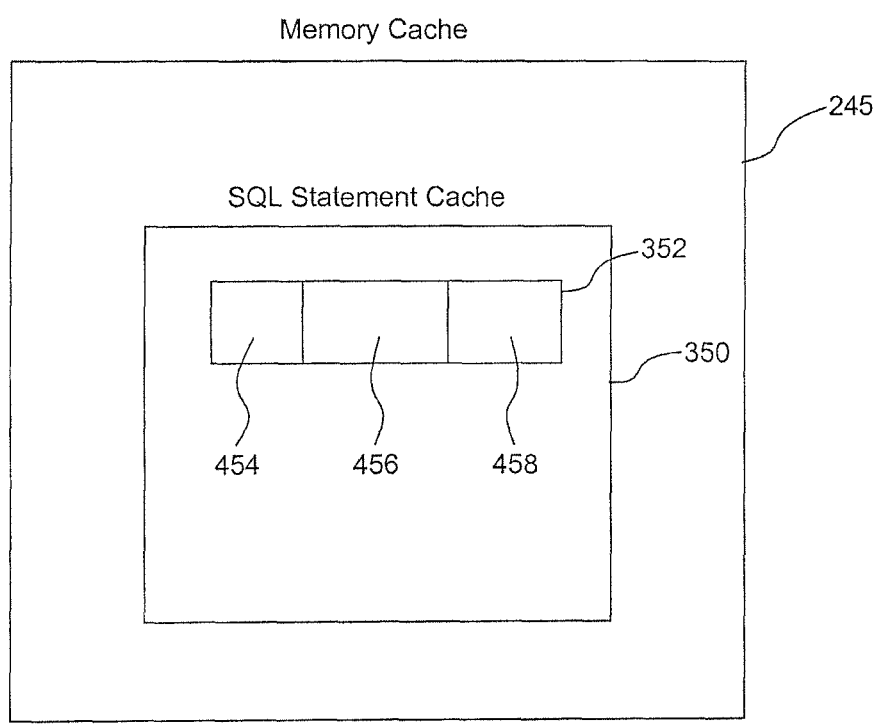
FIG. 4 is an exemplary embodiment 400 of a SQL Statement Cache.

In an embodiment, the global memory cache, such as SQL Statement cache 350, stores LWP objects associated with the prepared SQL statements. FIG. 4 is an illustrative embodiment of SQL Statement Cache 350. SQL Statement Cache 350 includes multiple SQL statement entries 352. Each SQL statement entry 352 includes an LWP object identifier (LWP object ID) 454, an LWP name 456, and a prepared SQL text 458.

In an embodiment, Dynamic SQL Cache entry 341 has been extended to include query plan reference 348 to query plan entry 364. Query plant entry 364 stores query plans in Procedure Cache 360. A person skilled in relevant arts will understand how a memory is accessed by using a reference. Because the query plan entry 364 is accessed by query plan reference 348, database server system 240 is operable to access the query plan without obtaining the access spinlocks to access Procedure Cache 360.

Figure 8:
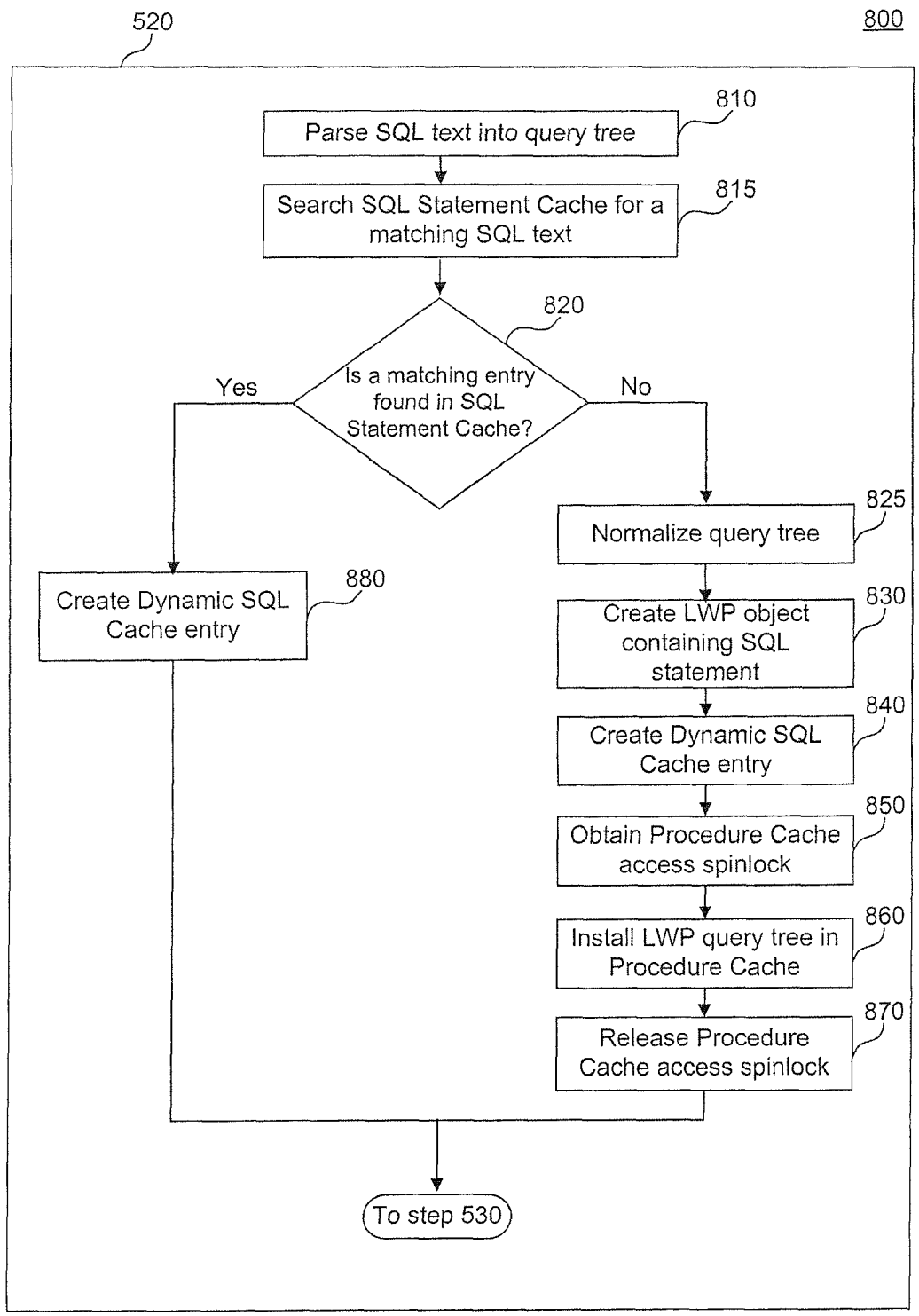
FIG. 8 is a flowchart of an exemplary embodiment 800 illustrating the steps of executing a Dynamic SQL Prepare process.

FIG. 8 is a flowchart illustrating an exemplary embodiment 800 of the Dynamic SQL Prepare process of step 520, using Dynamic SQL Cache 340, SQL Statement Cache 350 and Procedure Cache 360. In an embodiment, database server system 240 is operable to reuse the generated query plan for executing identical prepared SQL statements that have been received by multiple clients 210.

At step 810, database server system 240 parses the SQL text associated with the prepared SQL statement into the query tree.

At step 815, database server system 240 accesses SQL Statement Cache 350.

At step 820, database server system 240 compares the SQL text associated with the prepared SQL statement against SQL text 458 stored in SQL Statement entries 352. If the corresponding SQL text is found, database server system 240 proceeds to step 880. If not, then to step 825.

At step 880, database server system 240 creates Dynamic SQL entry 342. LWP identifier 454 and LWP name 456 are copied from Statement Cache 350 into Dynamic SQL entry 342. After step 880, the Dynamic SQL Prepare process is complete and database server system 240 proceeds to step 530.

However, if the SQL text is not found, database server system 240 proceeds to step 820. In steps 825-870, database server system proceeds to create the query tree for the LWP object and save the query tree in Procedure Cache 360.

At step 825, database server system 240 proceeds to normalize the query tree of step 810.

At step 830, database server system 240 proceeds to create the LWP object. The LWP object contains the SQL text.

At step 840, database server system 240 proceeds to create the Dynamic SQL entry 342 in Dynamic SQL Cache 340. As described above, the entry is created in memory space 341 that is allocated for a connection from a particular client 210.

At steps 850-870, database server system 240 proceeds to install the query tree associated with the LWP object in Procedure Cache 360. At step 850, the access spinlock is obtained for Procedure Cache 360. As described above, the access spinlock ensures that only one process is operable to access Procedure Cache 360 at a time.

At step 860, database server system 240 saves the query tree in Procedure Cache 360.

At step 870, database server system 240 releases the access spinlock for Procedure Cache 360. At step 870, database server system 240 completes the Dynamic SQL Prepare process, and proceeds to step 530, as described above.

Unlike conventional database server systems, database server system 240 reduces the serialized processing that is inherent to using access spinlocks to access the global memory cache. In an embodiment, database server system 240 obtains the access spinlock to access Procedure Cache 360 when the LWP object ID does not exist in Statement Cache 350. In another embodiment, database server system 240 obtains the access spinlock to access Procedure Cache 360 when the Dynamic SQL Prepare process is executed for the first time for a particular prepared SQL statement. When database server system 240 receives a second or subsequent identical prepared SQL statement from any client 210, database server system 240 copies the LWP object stored in Statement Cache entry 352 into Dynamic SQL entry 342 as described above.

FIG. 9 is a flowchart illustrating an exemplary embodiment 900 for executing a Dynamic SQL Execute process of step 550. Dynamic SQL Execute process executes the query plan associated with the LWP object. In an embodiment, Dynamic SQL Execute process generates the query plan when the query plan does not exist in Procedure Cache 360.

At step 905, database server system 240 retrieves Dynamic SQL Cache entry 352 from Dynamic SQL Cache 340.

At step 910, database server system 240 determines whether Dynamic SQL Execute process for the prepared SQL statement is being executed for the first time.

If the Dynamic SQL Execute process was not previously executed by database server system 240, database server system 240 proceeds to step 915. Otherwise, database server system 240 proceeds to step 990.

At step 915, database server system 240 obtains an access spinlock for Procedure Cache 915.

At step 920, database server system 240 determines if the SQL text is stored in SQL Statement Cache 350. Database server system 240 compares the SQL text associated with the prepared SQL statement to SQL text 458 stored in Statement Cache entries 352. If the SQL text is not stored in Statement Cache 350, the flowchart proceeds to step 925. Otherwise, the database server system 240 proceeds to step 970.

If the SQL text is not found in Statement Cache 350, database server system 240 generates the query plan for the prepared SQL statement from the query tree of step 760. In particular, at step 925, database server system 240 finds query tree entry 364 in Procedure Cache 360.

At step 930, database server system 240 releases the access spinlock to Procedure Cache 360.

At step 940, database server system 240 compiles the query plan from the query tree retrieved in step 925.

At step 945, database server system 240 creates Statement Cache entry 352 in Statement Cache 350.

At step 950, database server system 240 saves the LWP name, LWP Object ID, and SQL text in Statement Cache entry 352.

At step 955, database server system 240 obtains the access spinlock for Procedure Cache 360.

At step 960, database server system 240 saves the query plan in Procedure Cache 360 as query plan entry 364.

At step 965, database server system 240 releases the access spinlock for Procedure Cache 360.

At step 980, database server system 240 executes the query plan.

At step 985, database server system 240 stores the query plan reference to query plan entry 364 in Dynamic SQL Cache 340. The query plan reference is stored in query plan reference 348 in corresponding Dynamic SQL entry 342. After database server system 240 stores query plan reference 348 in Dynamic SQL Cache 340, the Dynamic SQL Execute process is complete. The database server system 240 proceeds to step 560, described above.

Going back to step 920, if the SQL text is found in Statement Cache 350, database server system 240 proceeds to step 970. At step 970, database server system 240 retrieves the query plan from query plan entry 364 in Procedure Cache 360.

At step 975, database server system 240 releases the access spinlock for Procedure Cache 360. After database server system 240 completes step 975, database server system 240 proceeds to step 980, described above.

Going back to step 910, if database server system 240 determines that the Dynamic SQL Execute process was previously executed for the prepared SQL statement, database server system 240 proceeds to step 990. A person skilled in the art will appreciate that the query plan will be saved in query plan entry 364 and query plan reference 348 will be saved in Dynamic SQL Cache 340 after the Dynamic SQL Execute process has been executed for the first time.

At step 990, database server system 240 retrieves query plan reference 348 from Dynamic SQL Cache entry 242. Database server system 240 then retrieves the query plan by referencing query plan entry 364 in Procedure Cache 360.

At step 995, database server system 240 executes the retrieved query plan of step 990. After database server system 240 executes the query plan, the Dynamic SQL Execute process is complete. Database server system 240 proceeds to step 560, described above.

4. Cloning Query Plans

In a conventional database server system, only one process is operable to execute the query plan at a time. If the conventional database server system receives an identical prepared SQL statement while the query plan is being executed by another process, the conventional database server system will wait for the first process to finish using the query plan. This results in the conventional database server system wasting valuable CPU cycles. Alternatively, a conventional database server system may resolve the issue by generating an identical query plan. Having the database server system build and compile a second copy of the query plan is inefficient and wastes valuable system resources.

In an embodiment, when a query plan is reserved by another process, database server system 240 is operable to clone a query plan stored in Procedure Cache 360. In an embodiment, database server system 240 is operable to clone the query plan while the original query plan is being executed.

In an embodiment, the cloned query plan shares a portion of the memory space allocated for the original query plan and also a memory space that is allocated for the cloned query plan. A person skilled in the relevant art will appreciate that the query plan comprises structures, values and pointers. A pointer may point to a value or to a structure. The structures may contain values that are stored at a particular memory address or pointers to another structure.

In an embodiment, when the query plan is cloned, a new memory space is allocated to hold the query plan structures that contain values. The pointers that reference query plan values are mapped to the new memory space. When database server system 240 clones the query plan, the portions of the original query plan that have values are copied. However, portions of the query plan that hold instructions are shared between the original query plan and the cloned query plan.

In an embodiment, query plan reference 348 in Dynamic SQL Cache entry 342 references a particular query plan. When database server system 240 receives an identical prepared SQL statement, database server system 240 clones the query plan in Procedure Cache 360. As a result, two Dynamic SQL Cache entries 342 do not reference the same query plan in Procedure Cache 360.

In an embodiment, the database connection reserves the query plan during the pendency of the connection or "pins" the query plan.

Figure 10:
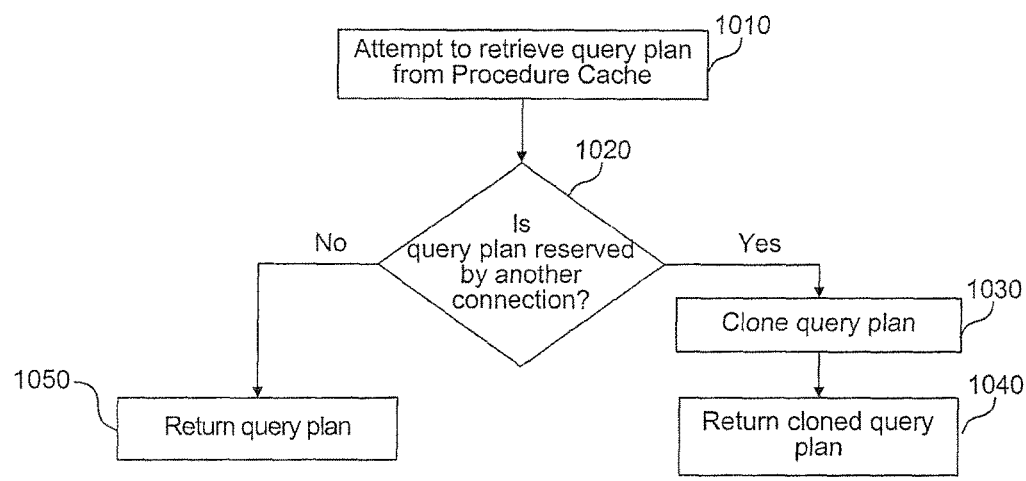
FIG. 10 is a flowchart of an exemplary embodiment 1000 illustrating the database server system determining when to clone a query plan.

FIG. 10 is a flowchart illustrating an exemplary embodiment 1000 of database server system 240 cloning the query plan.

At step 1010, database server system 240 attempts to retrieve the query plan from Procedure Cache 360.

At step 1020, database server system 240 determines whether the query plan is reserved by another database connection. In an embodiment, the Procedure Cache Manager, described above, determines if a query plan is reserved by the database connection. If the query plan is reserved, the flowchart proceeds to step 1030. Otherwise, the flowchart proceeds to step 1050.

At step 1030, database server system 240 proceeds to clone the query plan as described above.

At step 1040, database server system 240 saves the reference to the cloned query plan in Dynamic SQL Cache 340. In an embodiment, the Procedure Cache Manager marks the cloned query plan as reserved in Procedure Cache 360.

Going back to step 1020, if the query plan is not reserved by the database connection, the flowchart proceeds to step 1050.

At step 1050, database server 240 saves the reference to the query plan in Dynamic SQL Cache 340. In an embodiment, the Procedure Cache Manager marks the cloned query plan as reserved, as described above.

4. Conclusion

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for improving a query plan reuse in a database server system, comprising:
    receiving a query at a first node of a plurality of nodes of a database system, the query including one or more SQL commands;
    searching a SQL statement cache for SQL text corresponding to the one or more SQL commands;
    determining that a query plan in a global cache corresponding to the SQL statement cache matches the received query, wherein the query plan was prepared by a second node of the plurality of nodes;
    determining that the query plan is being executed by an executing node of the plurality of nodes of the database system; and
    reserving, by the first node, a clone of the query plan while it is being executed by the executing node, wherein the cloned query plan shares a portion of memory space allocated for the query plan, wherein the query plan and the cloned query plan are executed in parallel by the first node and the executing node, and wherein the reserving comprises:
        identifying a value portion of the query plan, wherein the value portion holds values associated with a prepared SQL statement;
        allocating a new storage space for the value portion of the cloned query plan;
        copying the value portion of the query plan into the new storage space; and
        storing values associated with the second client connection in the new storage space, the storing values comprising storing instructions shared between the cloned query plan and the query plan in the memo space allocated for the query plan.

2. The method of claim 1, wherein the reserving a clone of the query plan comprises storing a reference to the cloned query plan in a local cache storage.

3. The method of claim 1, wherein the determining that a query plan in a global cache is performed by a global cache storage manager.

4. The method of claim 1, wherein an instruction portion of the query plan is shared by the query plan and the cloned query plan.

5. The method of claim 1, wherein a prepared SQL statement comprises a prepared SQL name, and a prepared SQL text is retrieved from the database server system based on the prepared SQL name.

6. A database server system for improving a query plan reuse comprising:
    a memory; and
    at least one processor coupled to the memory and configured to:
        receive a query at a first node of a plurality of nodes of a database system, the query including one or more SQL commands;
        search a SQL statement cache for SQL text corresponding to the one or more SQL commands;
        determine that a query plan in a global cache corresponding to the SQL statement cache matches the received query, wherein the query plan was prepared by a second node of the plurality of nodes;
        determine that the query plan is being executed by an executing node of the plurality of nodes of the database system; and
        reserve, by the first node, a clone of the query plan while it is being executed by the executing node, wherein the cloned query plan shares a portion of memory space allocated for the query plan, wherein the query plan and the cloned query plan are executed in parallel by the first node and the executing node, and wherein the at least one processor that reserves is configured to:
        identify a value portion of the query plan, wherein the value portion holds values associated with a prepared SQL statement,
        allocate a new storage space for the value portion of the cloned query plan;
        copy the value portion of the query plan into the new storage space; and
        store values associated with the second client connection in the new storage space the at least one processor that stores values is configured to store instructions shared between the cloned query plan and the query plan in the memory space allocated for the query plan.

7. The system of claim 6, wherein to reserving a clone of the query plan, the at least one processor is configured to store a reference to the cloned query plan in a local cache storage.

8. The system of claim 6, wherein a prepared SQL statement comprises a prepared SQL name, and a prepared SQL text is retrieved from the database server system based on the prepared SQL name.

9. A tangible computer-readable device having instructions stored thereon that, when executed by at least one computing device, causes the at least one computing device to perform operations comprising:

receiving a query at a first node of a plurality of nodes of a database system, the query including one or more SQL commands;

searching a SQL statement cache for SQL text corresponding to the one or more SQL commands;

determining that a query plan in a global cache corresponding to the SQL statement cache matches the received query, wherein the query plan was prepared by a second node of the plurality of nodes;

determining that the query plan is being executed by an executing node of the plurality of nodes of the database system; and reserving, by the first node, a clone of the query plan while it is being executed by the executing node, wherein the cloned query plan shares a portion of memory space allocated for the query plan, wherein the query plan and the cloned query plan are executed in parallel by the first node and the executing node, and wherein the reserving comprises:

identifying a value portion of the query plan, wherein the value portion holds values associated with a prepared SQL statement;

allocating a new storage space for the value portion of the cloned query plan;

copying the value portion of the query plan into the new storage space; and storing values associated with the second client connection in the new storage space, the storing values comprising storing instructions shared between the cloned query plan and the query plan in the memo space allocated for the query plan.

10. The computer-readable device of claim 9, wherein a private cache storage is accessible to the client connection and the global cache storage is accessible to the plurality of client connections.

11. The method of claim 1, wherein the generating the cloned query plan further comprises:

allocating a new memory space to hold structures associated with the cloned query plan that contain values, wherein pointers that reference query plan values are mapped to the new memory space.

12. The method of claim 1, wherein a second prepared SQL statement associated with the cloned query plan is identical to a first prepared SQL statement associated with the determined query plan.

13. The method of claim 1, wherein the reserving is performed while the query plan is locked and without waiting for the lock to be released.

14. The method of claim 1, wherein the reserving comprises generating a light-weight stored procedure object comprising SQL text and a query tree associated with the SQL text.

* * * * *